United States Patent
Hara et al.

(10) Patent No.: US 11,572,970 B2
(45) Date of Patent: Feb. 7, 2023

(54) VENT PIPE ISOLATION BALLOON FOR LIQUEFIED GAS STORAGE TANK AND VENT PIPE ISOLATION DEVICE

(71) Applicant: MUTSUBISHI RUBBER CO., LTD., Kobe (JP)

(72) Inventors: Masaki Hara, Akashi (JP); Kodai Maeno, Kobe (JP)

(73) Assignee: MUTSUBISHI RUBBER CO., LTD., Kobe (JP)

( * ) Notice: Subject to any disclaimer, the term of this patent is extended or adjusted under 35 U.S.C. 154(b) by 417 days.

(21) Appl. No.: 16/759,855

(22) PCT Filed: Mar. 26, 2019

(86) PCT No.: PCT/JP2019/012920
§ 371 (c)(1),
(2) Date: Apr. 28, 2020

(87) PCT Pub. No.: WO2020/039637
PCT Pub. Date: Feb. 27, 2020

(65) Prior Publication Data
US 2020/0332939 A1 Oct. 22, 2020

(30) Foreign Application Priority Data
Aug. 23, 2018 (JP) .............................. JP2018-156135

(51) Int. Cl.
*F16L 55/124* (2006.01)
*C08J 5/04* (2006.01)
(Continued)

(52) U.S. Cl.
CPC ............. *F16L 55/124* (2013.01); *C08J 5/046* (2013.01); *C08J 5/18* (2013.01); *C08L 83/04* (2013.01);
(Continued)

(58) Field of Classification Search
CPC ........ F16L 55/124; F16L 55/134; C08J 5/046; C08J 5/18; C08L 83/04; F17C 13/06
(Continued)

(56) References Cited

U.S. PATENT DOCUMENTS 1,993,307 A * 3/1935 Nicholson ............. F16L 55/124
285/338
3,211,574 A * 10/1965 Shannon .................... B05C 7/08
427/230
(Continued)

FOREIGN PATENT DOCUMENTS

GB    2257766 A *  1/1993  ............ F16L 55/134
JP    S51-5607 A    1/1976
(Continued)

Primary Examiner — Robert J Hicks
(74) Attorney, Agent, or Firm — Oliff PLC

(57) ABSTRACT

An object to provide a vent pipe isolation balloon for a liquefied gas storage tank, which has excellent physical strength, inflatability, and durability at cryogenic temperatures, and a vent pipe isolation device including the balloon. The vent pipe isolation balloon has inner and outer membranes made of silicon rubber, and a reinforcing substrate sandwiched between the inner membrane and the outer membrane. The balloon has an outer shape of a cylindrical shape or a truncated cone shape with both ends opened, and is inflated when an inert gas is injected into the balloon with the openings sealed. The reinforcing substrate is composed of a fiber bundle and has a network structure.

10 Claims, 17 Drawing Sheets (a)

(b)

(51) Int. Cl.
*C08J 5/18* (2006.01)
*C08L 83/04* (2006.01)
*F17C 13/06* (2006.01)

(52) U.S. Cl.
CPC ........... *F17C 13/06* (2013.01); *C08J 2423/06* (2013.01); *C08J 2483/04* (2013.01); *C08L 2203/16* (2013.01); *C08L 2205/16* (2013.01); *C08L 2207/068* (2013.01); *F17C 2205/0311* (2013.01); *F17C 2205/0352* (2013.01); *F17C 2221/033* (2013.01)

(58) Field of Classification Search
USPC ................... 220/745, 373, 367.1; 138/93, 89
See application file for complete search history.

(56) References Cited

U.S. PATENT DOCUMENTS

| | | | | |
|---|---|---|---|---|
| 3,607,361 | A * | 9/1971 | Hight | B05C 7/04 427/237 |
| 3,842,864 | A * | 10/1974 | Riegel | F16K 7/10 138/93 |
| 4,079,755 | A * | 3/1978 | Van der Lans | F16K 7/10 156/218 |
| 4,291,727 | A | 9/1981 | Yie et al. | |
| 6,263,896 | B1 * | 7/2001 | Williams | F16L 55/134 137/317 |
| 8,800,602 | B2 * | 8/2014 | Al Shammary | F16L 55/134 138/93 |
| 2020/0139690 | A1 * | 5/2020 | Sakellarides | C08L 67/02 |

FOREIGN PATENT DOCUMENTS

| | | |
|---|---|---|
| JP | S59-045394 U | 3/1984 |
| JP | S63-130991 A | 6/1988 |
| JP | H04-181097 A | 6/1992 |
| JP | 3041014 U | 9/1997 |
| JP | H10-101191 A | 4/1998 |
| JP | 2006-170366 A | 6/2006 |
| JP | 2006-207656 A | 8/2006 |
| JP | 2016-56905 A | 4/2016 |
| JP | 2017-9099 A | 1/2017 |
| JP | 2017-57996 A | 3/2017 |

* cited by examiner

[Fig. 1]
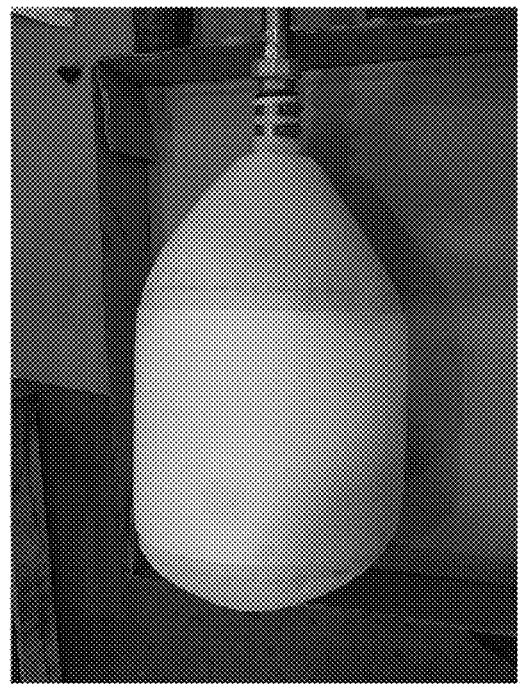
PRIOR ART (a)
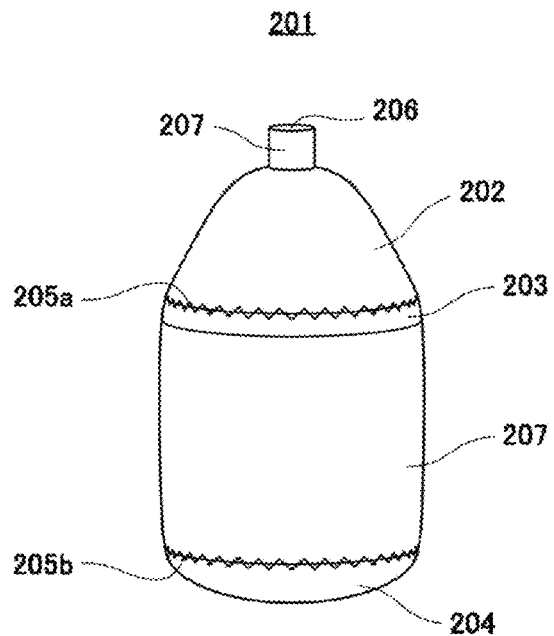
PRIOR ART (b)

[Fig. 2]
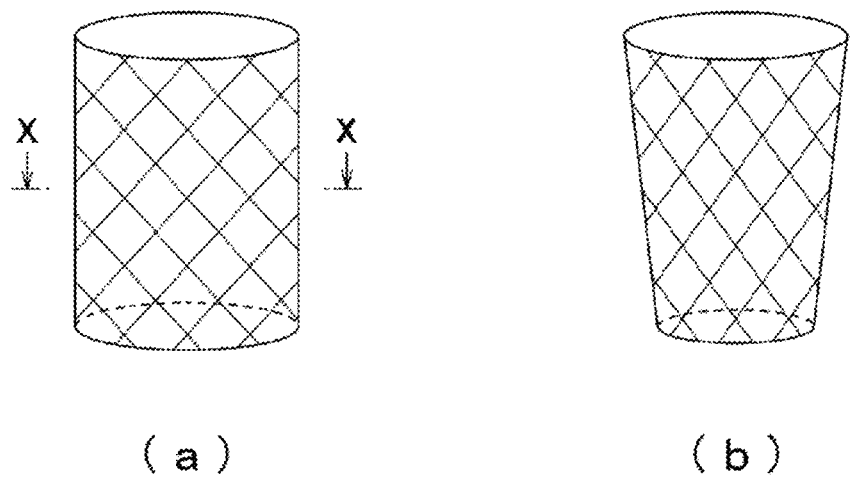
(a)  (b)
[Fig. 3]
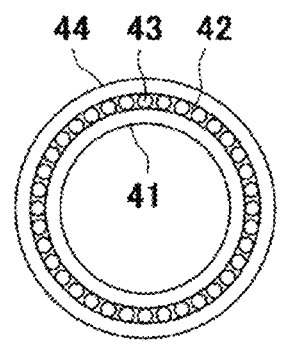

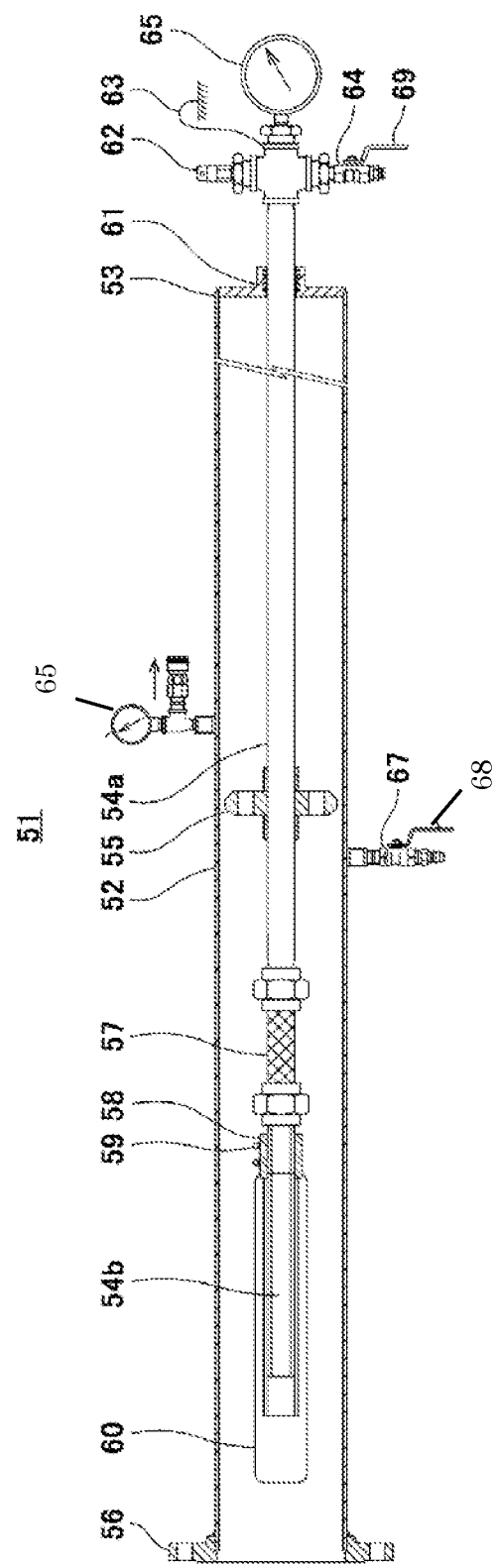
[Fig. 4]

[Fig. 5]
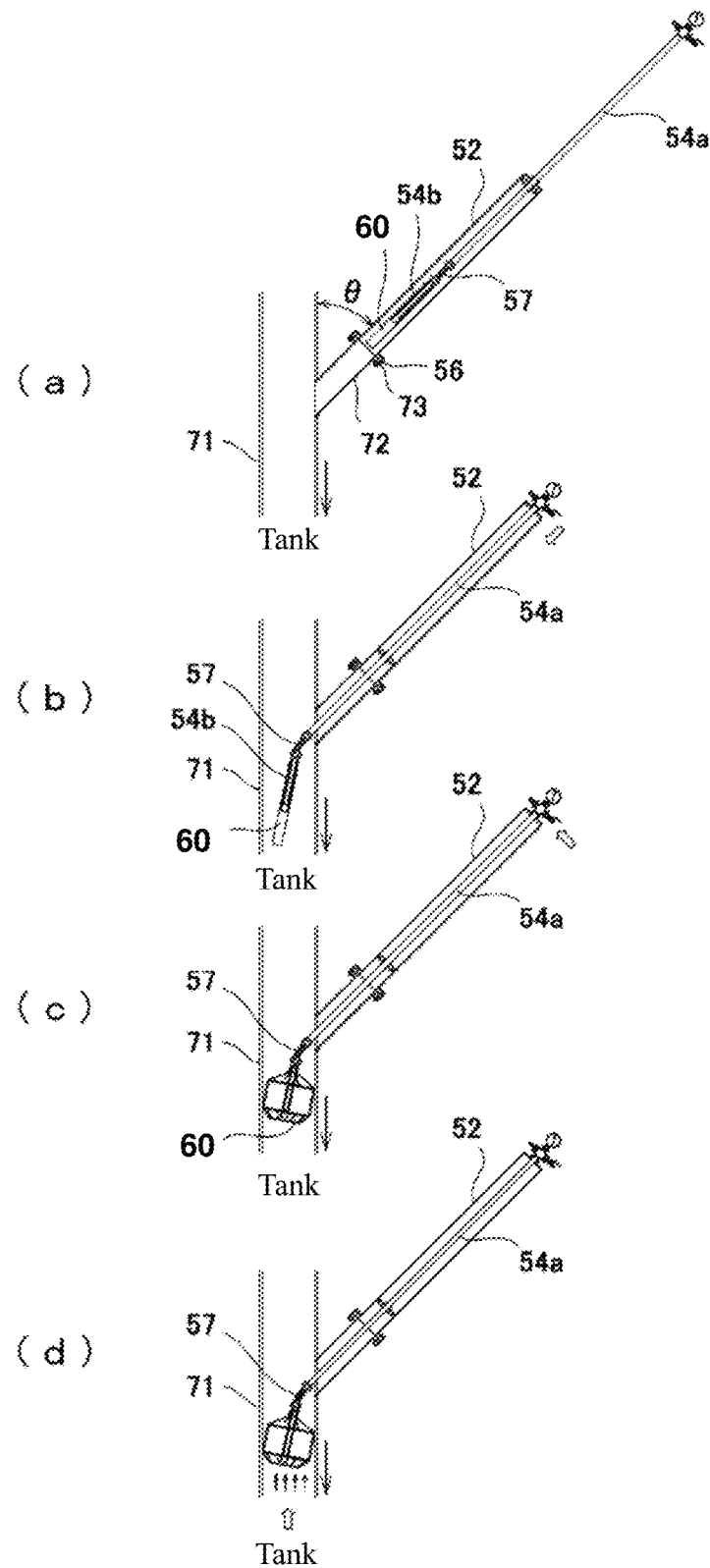

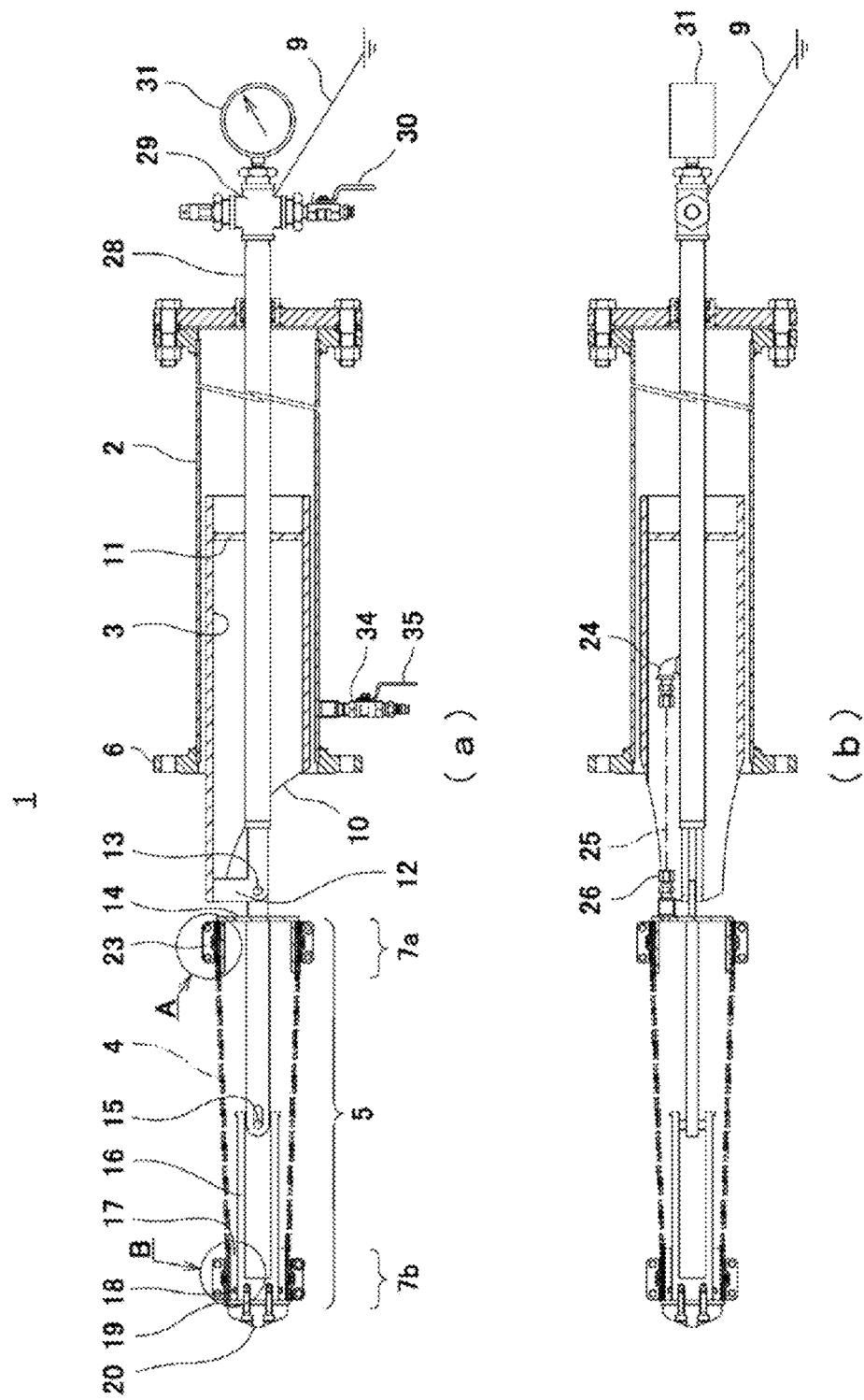
[Fig. 6]

[Fig. 7]
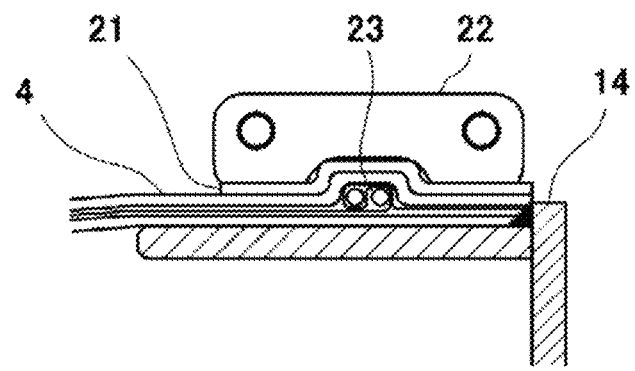
[Fig. 8]
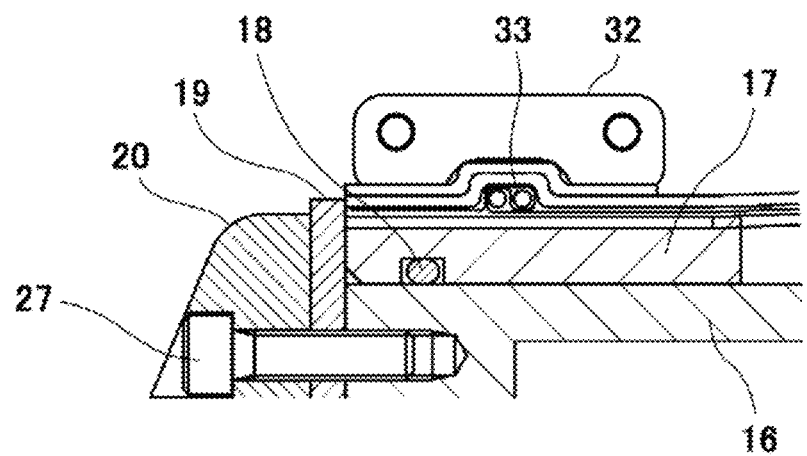

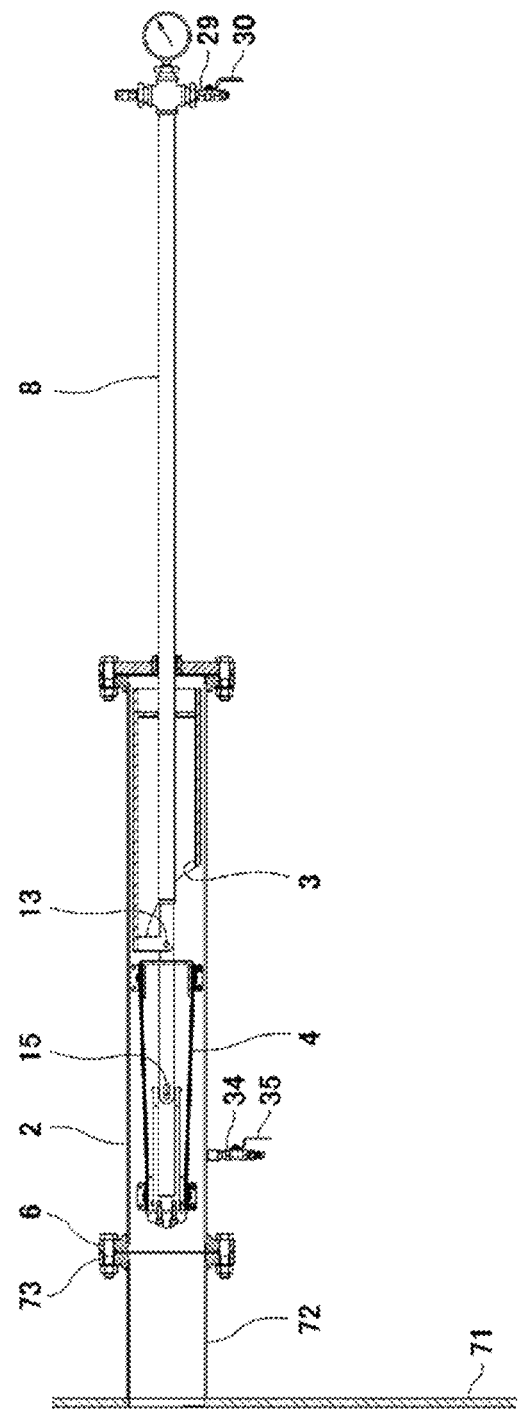
[Fig. 9A]

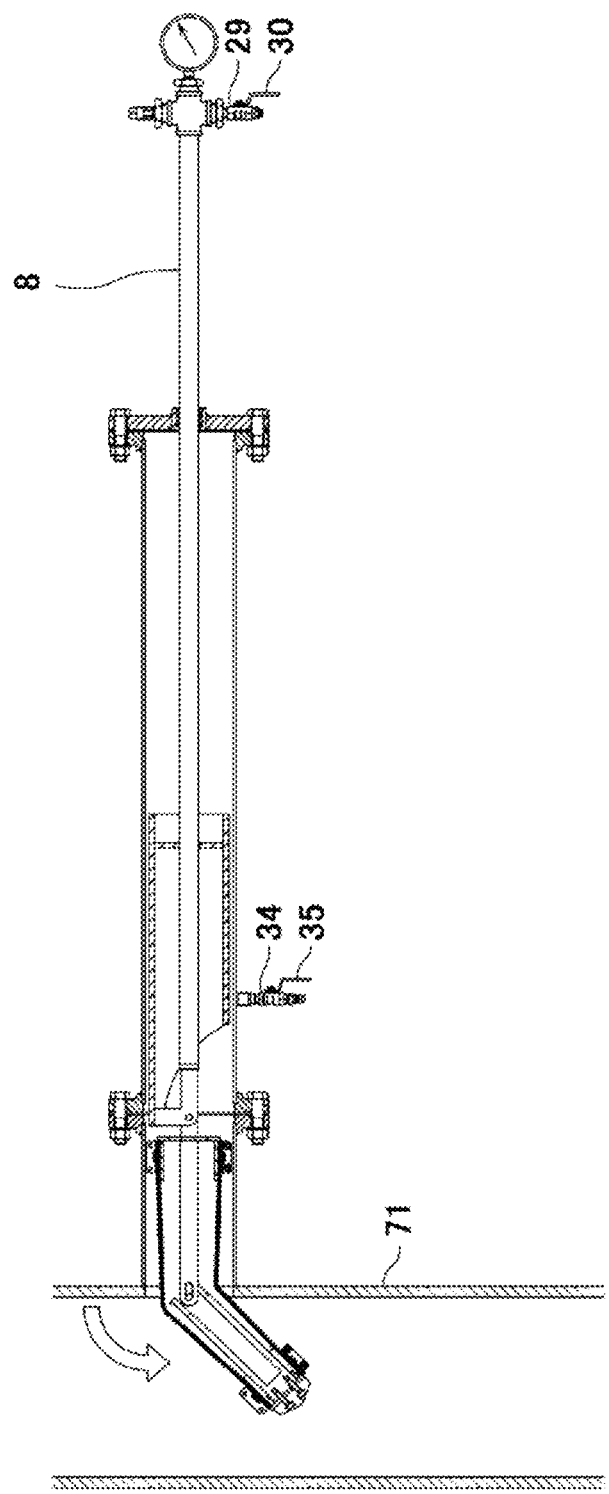
[Fig. 9B]

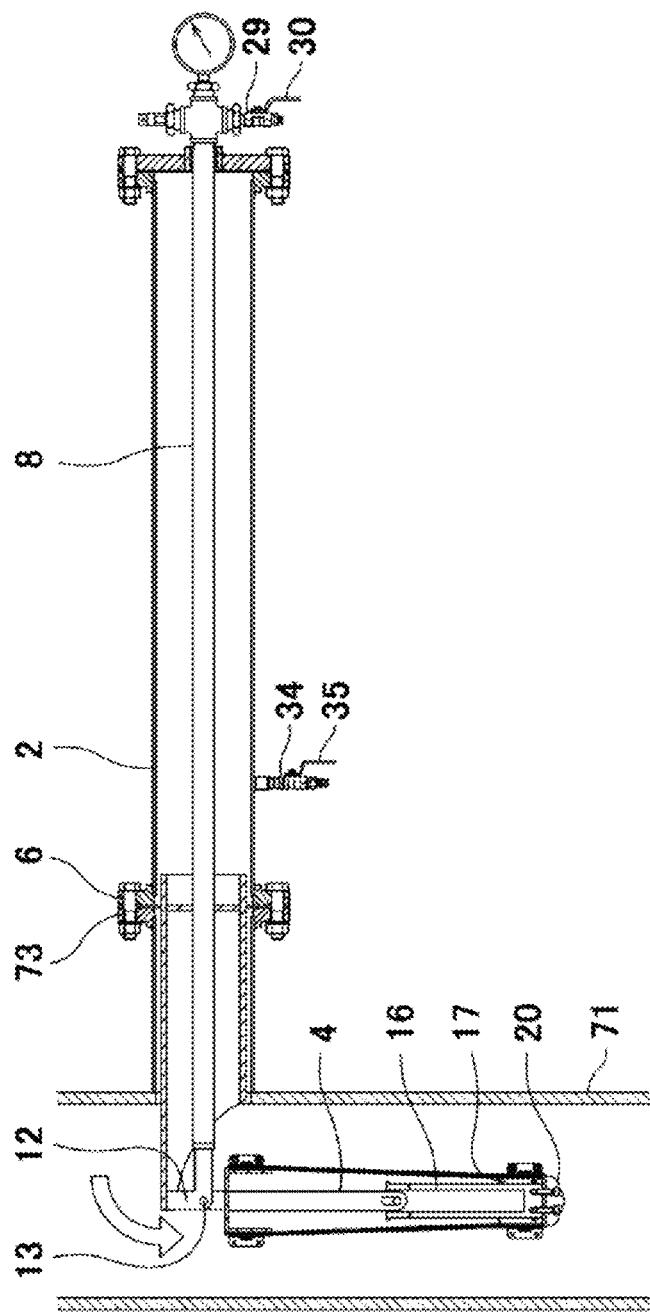
[Fig. 9C]

[Fig. 9D]
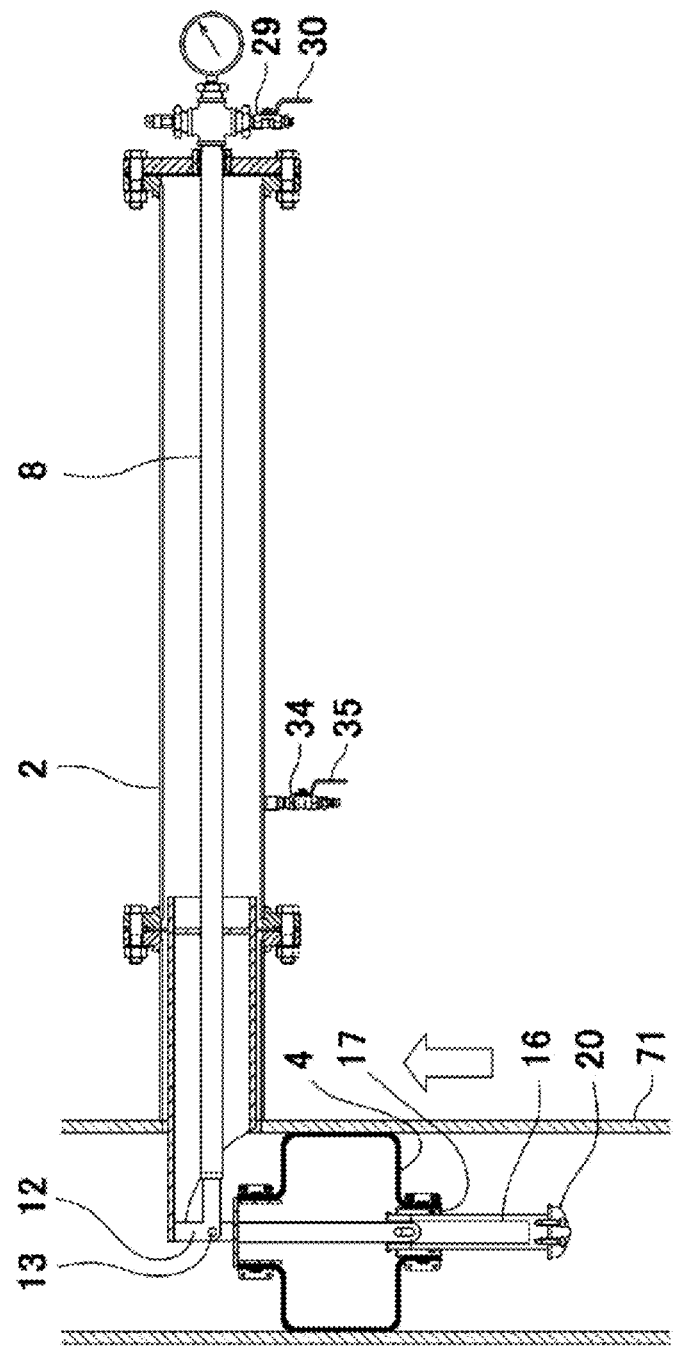

[Fig. 10]
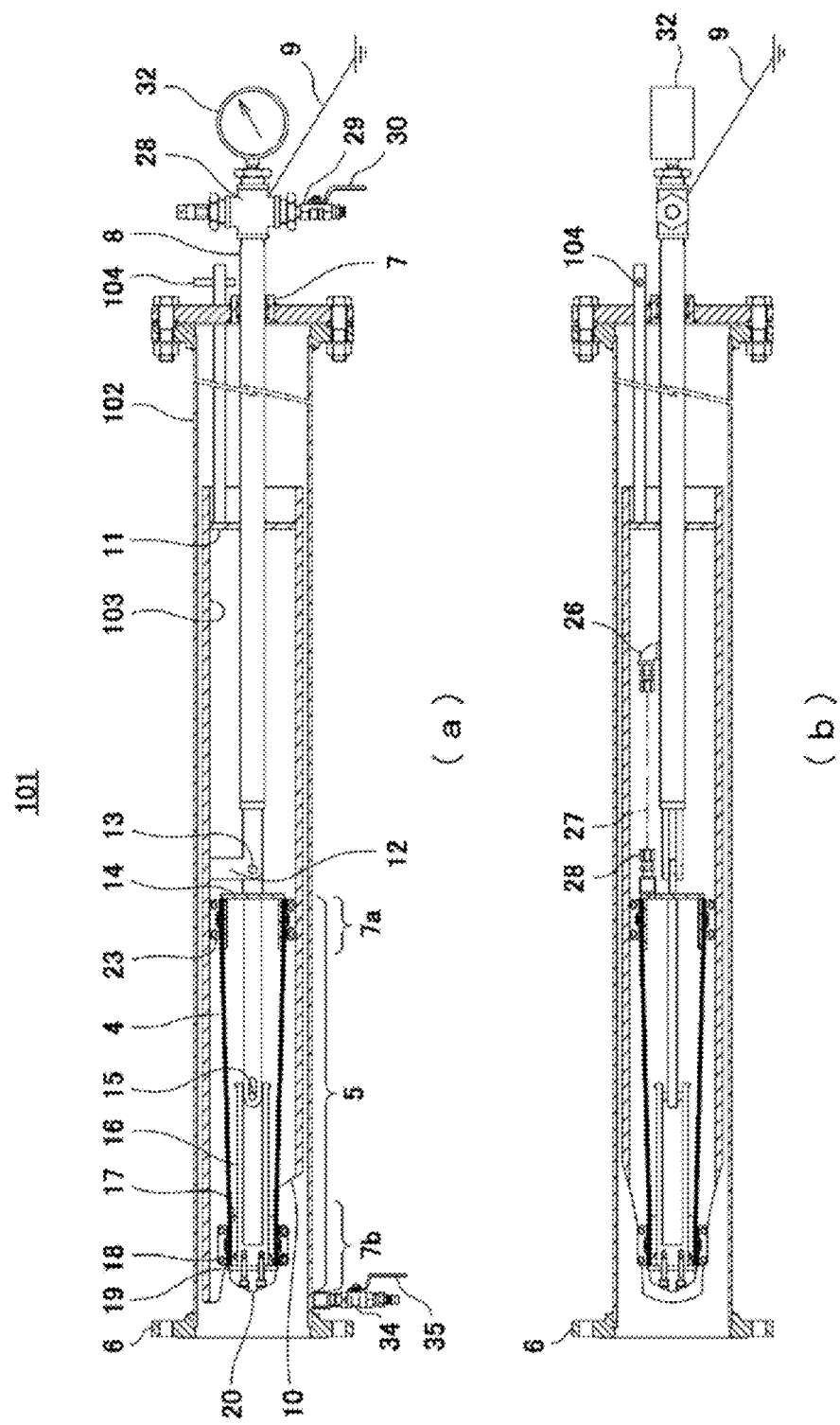

[Fig. 11A]
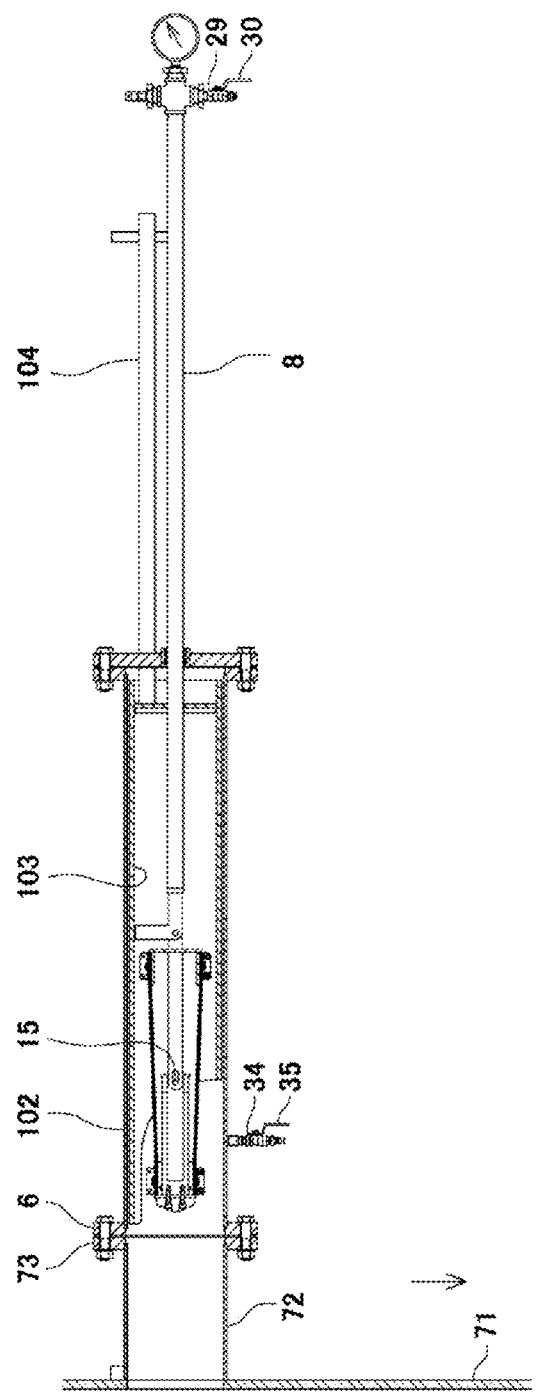

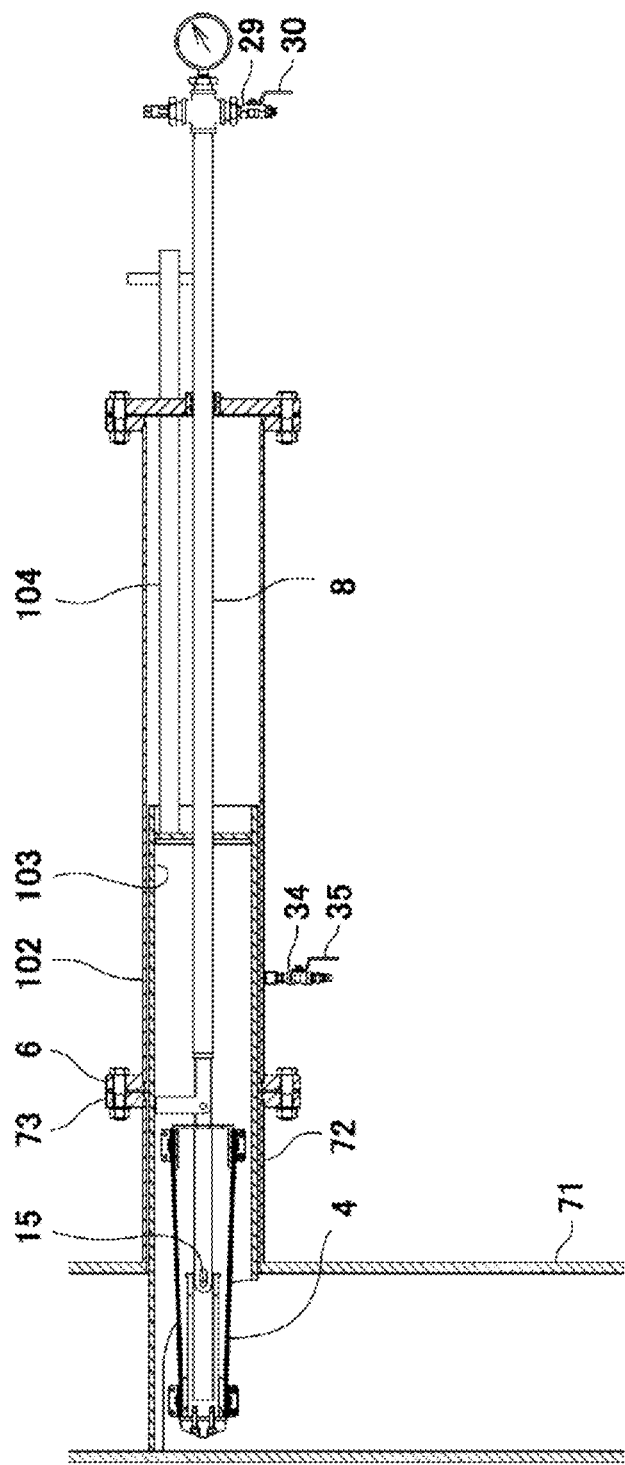
[Fig. 11B]

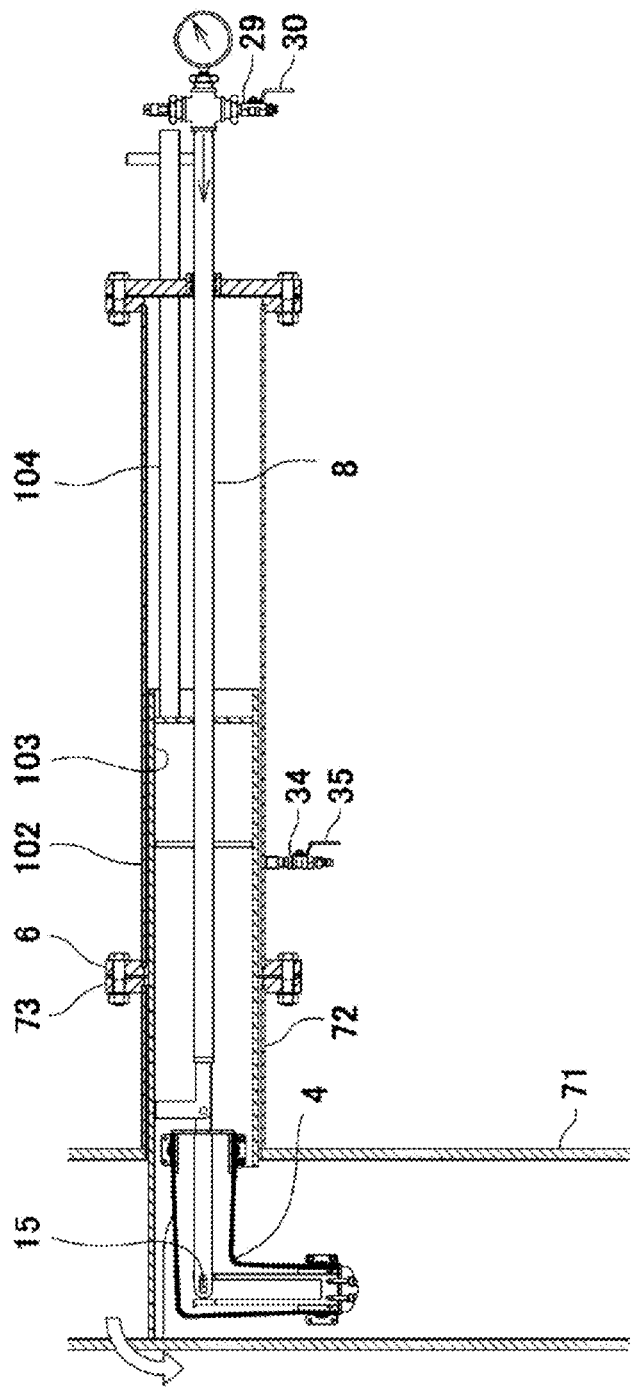
[Fig. 11C]

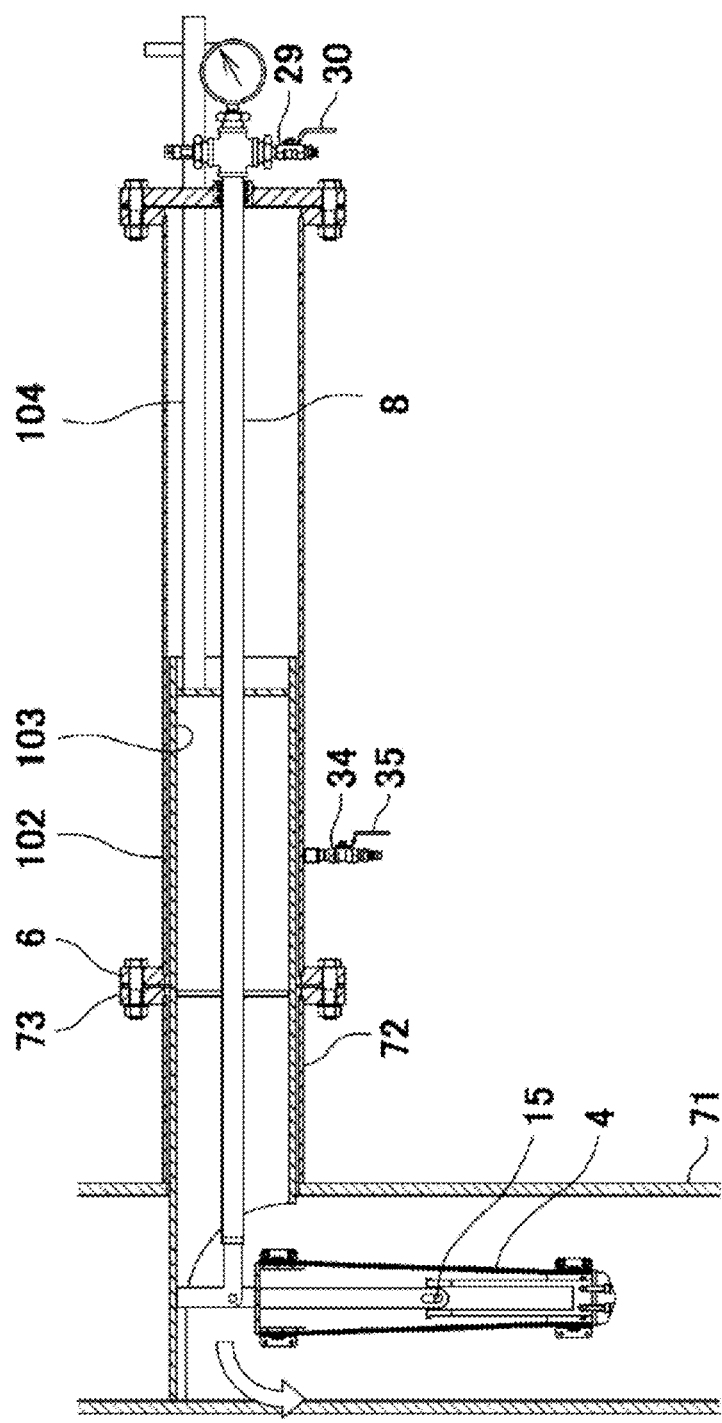
[Fig. 11D]

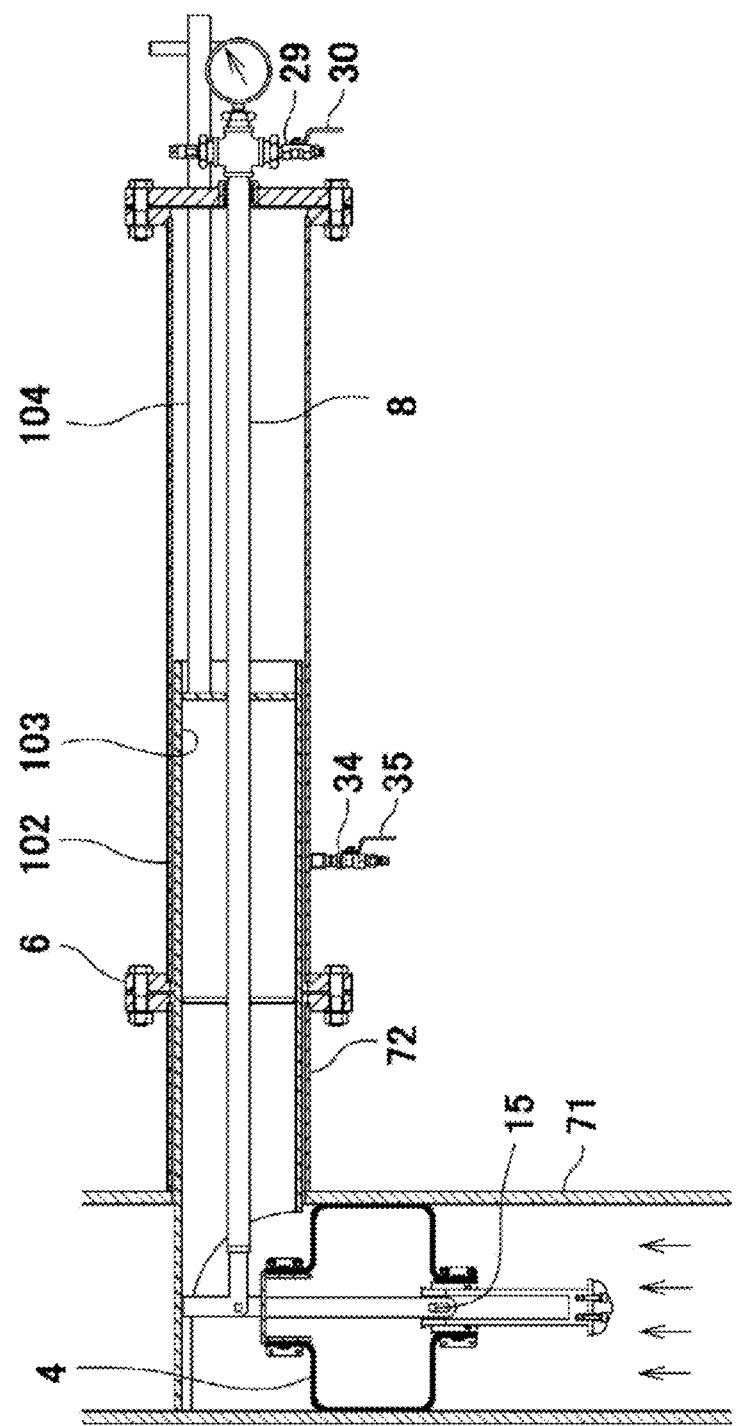
[Fig. 11E]

[Fig. 12]
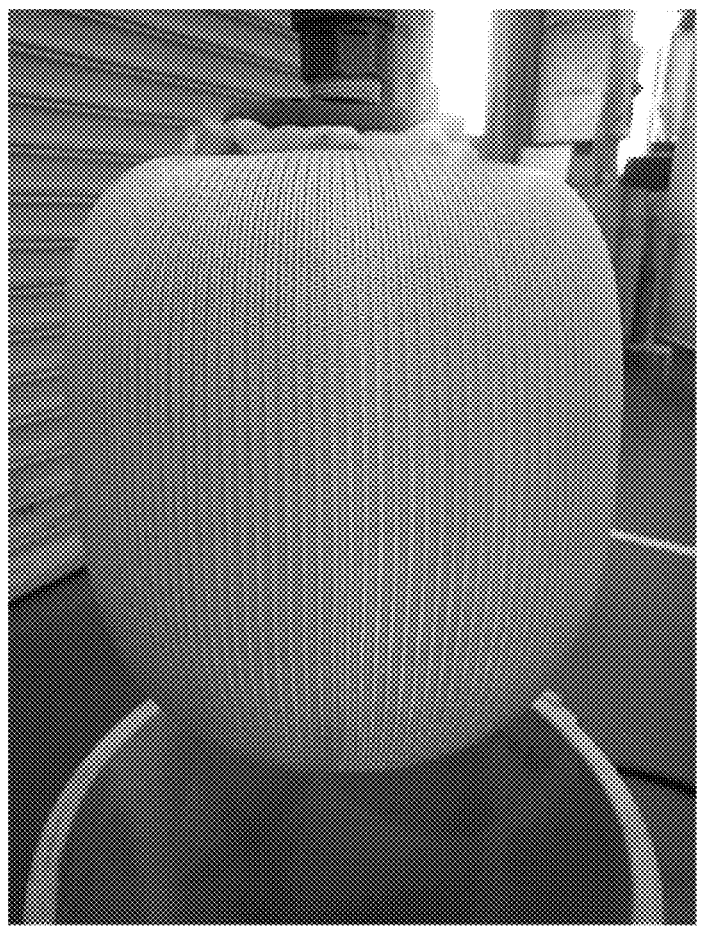

VENT PIPE ISOLATION BALLOON FOR LIQUEFIED GAS STORAGE TANK AND VENT PIPE ISOLATION DEVICE

TECHNICAL FIELD

The present invention relates to a balloon for temporarily isolating a vent pipe of a storage tank for liquefied natural gas or liquefied petroleum gas, and an isolation device used for isolating the vent pipe by inserting the balloon into the pipe.

BACKGROUND ART

When a gas pipe is repaired, a gasbag may be used to temporarily shut off gas. After the gasbag is inserted into the gas pipe, air is inserted to inflate the gasbag to a full inner diameter of the gas pipe, so that the gas pipe can be temporarily isolated (Patent Literatures 1 to 3).

On the other hand, a tanker that transports liquefied gas such as liquefied natural gas (LNG) or liquefied petroleum gas (LPG) includes a tank storing liquefied gas obtained by liquefying gas such as methane, propane, butane, ethylene, or ammonia at a cryogenic temperature. In such a storage tank of the tanker, a vent pipe is vertically connected to an upper portion of the tank, and a safety valve is provided at the top of the pipe. Although the safety valve needs to be inspected regularly, during the inspection, the vent pipe on the downstream side of the safety valve must be isolated to prevent leakage of vaporized gas to the outside. In the event of an emergency such as a failure of the safety valve, the vent pipe on the downstream side of the safety valve must be isolated in the same manner.

Here, tankers that transport liquefied gas are subjected to the International Gas Carrier Code (IGC Code) for ships that will begin construction on or after Jul. 1, 2016. The IGC code (8.2.9) stipulates that "a vent pipe device on the downstream side of a pressure relief valve should not be equipped with a stop valve". Unlike general pipes, a pipe cannot be isolated by the stop valve when safety valves (pressure relief valves) are checked or repaired. Thus, when the safety valve is checked or repaired, the pipe provided with the safety valve may be isolated using a device called a balloon.

On a vent pipe of a tanker that transports liquefied gas, a balloon insertion pipe is provided upstream of the safety valve. First, a lid of the insertion pipe is opened, and an insertion device balloon attached to the tip is attached to an inlet of the insertion pipe. Thereafter, the balloon attachment portion is inserted into the vent pipe, and an inert gas such as nitrogen gas is injected into the balloon to inflate the balloon and occlude the vent pipe. After the inert gas is injected into the balloon to a predetermined pressure, the safety valve is checked, repaired or replaced.

After completion of check or the like, the inert gas is extracted to deflate the balloon, the insertion device is pulled back, and the balloon is extracted from the vent pipe. A balloon insertion device is detached from the insertion pipe, and the lid of the insertion pipe is closed.

The balloon used for the purpose of isolating the vent pipe is generally a balloon which is formed into a bag shape by sewing a high-strength fabric and in which silicon rubber is applied to a portion in contact with an inner surface of the vent pipe in order to improve adhesion to the inner surface of the vent pipe. FIG. 1 shows an example of a conventional balloon (during inflation). FIG. 1(a) shows an appearance photograph, and FIG. 1(b) shows a configuration diagram thereof. Conventional balloons are generally based on a high-strength fabric made of a material such as nylon, aramid, or polyethylene. In FIG. 1(a), a top end portion (corresponding to an opening 206 in FIG. 1(b)) is airtightly fixed to an inert gas injection pipe. A balloon body is constituted of three portions including, an upper portion 202, an intermediate portion 203, and a lower portion 203, which are stitched by stitching portions 205a and 205b, respectively. A convex portion 208 is formed on the upper portion 202, and a balloon insertion device is fixed to an opening 206. A silicon rubber layer 207 is formed on the surface of the intermediate portion 203, and an engaging force due to the frictional resistance occludes the vent pipe.

CITATION LIST

Patent Literature

PTL 1: Japanese Registered Utility Model Application Publication No. 3041014
PTL 2: Japanese Patent Application Laid-Open Publication No. S63-130991 A
PTL 3: Japanese Examined Utility Model Application Publication No. H1-23031
PTL 4: Japanese Patent Application Laid-Open Publication No. 2006-170366
PTL 5: Japanese Patent Application Laid-Open Publication No. H10-101191
PTL 6: Japanese Patent Application Laid-Open Publication No. S51-5607
PTL 7: Japanese Patent Application Laid-Open Publication No. 2016-56905
PTL 8: Japanese Patent Application Laid-Open Publication No. H4-181097
PTL 9: Japanese Patent Application Laid-Open Publication No. 2017-9099
PTL 10: Japanese Patent Application Laid-Open Publication No. 2017-57996

SUMMARY OF INVENTION

Technical Problem

Since ultralow-temperature LNG or LPG is stored in a liquefied gas storage tank, it is necessary to select a material that can be expanded even in a cryogenic-temperature atmosphere, unlike a general vent pipe isolation balloon. In conventional balloons, a fabric used as a substrate is not inflatable. Therefore, if such a balloon is used repeatedly, or if an internal pressure during inflation is increased to increase the occlusivity of the vent pipe, stitched portions of the fabric may be damaged, or the balloon tends to crack due to application of stress to a boundary surface between the fabric and silicone rubber, and thus the physical strength is not sufficient.

On the other hand, even if an attempt is made to produce a balloon using only a flexible material even in a cryogenic-temperature atmosphere such as silicon rubber, the internal pressure during inflation cannot be increased due to low physical strength. On the other hand, if a thick fabric is used as a substrate, it becomes difficult to insert the balloon into the vent pipe even in a non-inflated state, and since the inflatability is low, the adhesion to the inner surface of the vent pipe is lowered. Moreover, it becomes easy to peel between the fabric substrate and the silicon rubber layer having high shrinkability, so that the durability of the balloon is lowered.

An object of the present invention is to provide a vent pipe isolation balloon for a liquefied gas storage tank, which has sufficient physical strength, is highly inflatable, and has excellent durability even when used repeatedly in a cryogenic-temperature atmosphere, and a vent pipe isolation device including the balloon.

Solution to Problem

As a result of continued intensive studies to solve the above-mentioned problems, the present inventors have found that in order to achieve both the physical strength of a balloon and the inflatability in a cryogenic-temperature atmosphere, a substrate which is not a flat substrate having no flexibility such as a fabric but a substrate in which fibers having flexibility even in a cryogenic-temperature atmosphere have a network structure may be mainly used, and silicon rubber may be applied onto both the inner and outer surfaces of the substrate to form a silicon rubber layer, and the inventors completed the invention.

Specifically, the present invention relates to a balloon for temporarily isolating a vent pipe of a liquefied gas storage tank. The balloon includes: an inner membrane; a reinforcing substrate; and an outer membrane, the balloon having a cylindrical shape or a truncated cone shape having openings at both ends, and being inflated when an inert gas is injected into the balloon with the openings sealed, in which a material of the inner membrane and the outer membrane is silicon rubber, the reinforcing substrate is formed of a bundle of ultra-high molecular weight polyethylene fibers and has a network structure, the reinforcing substrate is sandwiched between the inner membrane and the outer membrane, the fiber bundle has a diameter of from 440 dtex to 1760 dtex, the number of filaments constituting the fiber bundle is from 390 to 1560, in the network structure, a knot between fibers is from 0 mm to 5 mm when the balloon is not inflated, and the inner membrane and the outer membrane each have a thickness of from 2 mm to 6 mm.

Differently from a conventional vent pipe isolation balloon for a liquefied gas storage tank, in the balloon of the present invention, the reinforcing substrate sandwiched between the inner membrane and the outer membrane made of cold resistant rubber having flexibility even in a cryogenic-temperature atmosphere, such as silicon rubber, is not a flat substrate such as a fabric, but has a network structure formed of a bundle of fibers such as ultra-high density polyethylene having flexibility and expandability even in a cryogenic-temperature atmosphere. By adopting such a network structure, even when an inert gas is injected into the balloon to inflate the balloon, all of the outer membrane, the reinforcing substrate, and the inner membrane have flexibility. Therefore, unlike conventional balloons, stress is hardly applied to a boundary surface between the reinforcing substrate and the outer and inner membranes, and even if the internal pressure is increased, the balloon is hardly cracked.

Further, since the balloon of the present invention is formed from a material having flexibility even in a cryogenic-temperature atmosphere, the balloon can be easily inserted into the vent pipe in a non-inflated state. Furthermore, the balloon of the present invention can stably occlude the pipe regardless of the size of the inner diameter of the pipe to be inserted by adjusting an inflation rate according to the internal pressure, and a single balloon can be applied pipes having various inner diameters.

The fiber bundle is a bundle of fibers whose physical strength does not decrease even in a cryogenic-temperature atmosphere. Specific examples of the fiber include organic polymer fibers such as polyethylene, nylon, and aramid, and polyethylene, particularly ultra-high molecular weight polyethylene is particularly preferred. Here, ultra-high molecular weight polyethylene means polyethylene having a molecular weight of about 1 to 7 million.

From the viewpoints of physical strength as a reinforcing substrate, ease of expansion, and ease of insertion into a vent pipe, the fiber bundle constituting the network structure preferably has a diameter of from 440 dtex to 1760 dtex. The number of filaments constituting the fiber bundle is preferably from 390 to 1560.

From the viewpoint of maintaining inflatability of the balloon and the physical strength as the reinforcing substrate, a space (knot) between the fibers constituting the network structure is preferably from 0 mm to 5 mm when the balloon is not inflated, more preferably from 0.05 mm to 3 mm.

The network structure of the reinforcing substrate is preferably a network structure in which polymer fibers are woven by jersey stitch. This is because the network structure has high elasticity.

From the viewpoint of physical strength, occlusivity of the vent pipe, and the inflatability of the balloon, the inner membrane and the outer membrane preferably each have a thickness of from 2 mm to 6 mm. The inner membrane and the outer membrane may have different thicknesses, but are preferably the same.

The present invention relates to a vent pipe isolation device for temporarily isolating a vent pipe of a liquefied gas storage tank. The vent pipe isolation device includes: a storage pipe; an operation pipe; an intermediate support portion; a balloon attachment portion; and a balloon, in which the storage pipe has a closing flange on an opening side thereof, and stores the intermediate support portion, the intermediate support portion is movable in the storage pipe in an axial direction, and has a front end side opening downward, the storage pipe, the intermediate support portion, and the balloon attachment portion are arranged along an identical central axis, the balloon attachment portion is adjacent to the front end side of the intermediate support portion, the intermediate support portion is fixed to the operation pipe at both ends thereof, the balloon attachment portion has a first balloon attachment member and a second balloon attachment member at both ends thereof and a hinge portion at an intermediate position, a side forwardly of the hinge portion being bendable, the operation pipe is bendable at a fixing portion on a side of the intermediate support portion that is adjacent to the balloon attachment portion, the first balloon attachment member and the second balloon attachment member are fixing members for airtightly fixing the balloon, at least one of the first balloon attachment member and the second balloon attachment member being movable in the axial direction, the operation pipe includes therein a gas pipe for supplying an inert gas to the balloon from an outside and discharging the inert gas from the balloon to the outside, the balloon includes an inner membrane, a reinforcing substrate, and an outer membrane, the balloon having a cylindrical shape or a truncated cone shape having openings at both ends thereof, and being inflated when an inert gas is injected into the balloon with the openings sealed, a material of the inner membrane and the outer membrane is cold resistant rubber, the reinforcing substrate is formed of a fiber bundle and has a network structure, and the reinforcing substrate is sandwiched between the inner membrane and the outer membrane.

The present invention further relates to a vent pipe isolation device for temporarily isolating a vent pipe of a liquefied gas storage tank. The vent pipe isolation device includes: a storage pipe; an operation pipe; an intermediate support portion; a balloon attachment portion; and a balloon, in which the storage pipe has a closing flange on an opening side thereof, and stores the intermediate support portion and the balloon attachment portion, the intermediate support portion and the balloon attachment portion are arranged in the storage pipe along an identical central axis, the intermediate support portion and the balloon attachment portion are movable in the storage pipe in an axial direction, and has a front end side opening downward, the intermediate support portion is fixed to the operation pipe at an intermediate position thereof and on a closed portion side, the balloon attachment portion has a first balloon attachment member and a second balloon attachment member at both ends thereof and a hinge portion at an intermediate position, a side forwardly of the hinge portion being bendable, the operation pipe is bendable at a fixing portion on a side of the intermediate support portion that is adjacent to the balloon attachment portion, the first balloon attachment member and the second balloon attachment member are fixing members for airtightly fixing the balloon, at least one of the first balloon attachment member and the second balloon attachment member being movable in the axial direction, the operation pipe includes therein a gas pipe for supplying an inert gas to the balloon from an outside and discharging the inert gas from the balloon to the outside, the balloon includes an inner membrane, a reinforcing substrate, and an outer membrane, the balloon having a cylindrical shape or a truncated cone shape having openings at both ends thereof, and being inflated when an inert gas is injected into the balloon with the openings sealed, a material of the inner membrane and the outer membrane is cold resistant rubber, the reinforcing substrate is formed of a fiber bundle and has a network structure, and the reinforcing substrate is sandwiched between the inner membrane and the outer membrane.

Advantageous Effects of Invention

According to the present invention, the vent pipe can be isolated safely and stably.

BRIEF DESCRIPTION OF DRAWINGS

FIG. 1 is an example of a conventional balloon, where (a) is an appearance photograph and (b) is a configuration diagram.

FIG. 2 is an external view of a vent pipe isolation balloon of the present invention.

FIG. 3 is a cross-sectional view taken along a line X-X in FIG. 2(a).

FIG. 4 is an example of a conventional vent pipe isolation device.

FIG. 5 is a procedure for using a balloon insertion device 51 shown in FIG. 4.

FIG. 6 is an example of a vent pipe isolation device of the present invention.

FIG. 7 is an enlarged view of a portion indicated by a symbol A in FIG. 6(a).

FIG. 8 is an enlarged view of a portion indicated by a symbol B in FIG. 6(a).

FIG. 9A is a procedure for using a balloon insertion device 1 shown in FIG. 6.

FIG. 9B is the procedure for using the balloon insertion device 1 shown in FIG. 6.

FIG. 9C is the procedure for using a balloon insertion device 1 shown in FIG. 6.

FIG. 9D is the procedure for using the balloon insertion device 1 shown in FIG. 6.

FIG. 10 is another example of the vent pipe isolation device of the present invention.

FIG. 11A is a procedure for using a balloon insertion device 101 shown in FIG. 10.

FIG. 11B is the procedure for using the balloon insertion device 101 shown in FIG. 10.

FIG. 11C is the procedure for using the balloon insertion device 101 shown in FIG. 10.

FIG. 11D is the procedure for using the balloon insertion device 101 shown in FIG. 10.

FIG. 11E is the procedure for using the balloon insertion device 101 shown in FIG. 10.

FIG. 12 is an appearance photograph of a vent pipe isolation balloon of Example 1.

DESCRIPTION OF EMBODIMENTS

Hereinafter, embodiments of the present invention will be described with reference to the drawings as appropriate. The present invention is not limited to the following description.

Vent Pipe Isolation Balloon of the Present Invention

FIG. 2 shows an external view of a vent pipe isolation balloon of the present invention. The vent pipe isolation balloon of the present invention is used as an isolation portion of a vent pipe isolation device to be described later. The vent pipe isolation balloon of the present invention may have a cylindrical shape as shown in FIG. 2(a) or a truncated cone shape (hollow truncated cone shape) as shown in FIG. 2(b). In FIGS. 2(a) and 2(b), the upper and lower ends are openings.

FIG. 3 is a cross-sectional view taken along a line X-X in FIG. 2(a). The vent pipe isolation balloon of the present invention includes an inner membrane 41 made of silicon rubber, a reinforcing substrate 42 formed from fibers 43 such as polyethylene, and an outer membrane 44 formed from a material such as silicon rubber. The vent pipe isolation balloon shown in FIG. 2(b) has the same structure. The fiber 43 is a fiber bundle composed of a plurality of single fibers.

The reinforcing substrate 42 has a network structure made of the fibers 43. As a technical feature of the vent pipe isolation balloon of the present invention, the inner membrane 41 and the outer membrane 44 formed of a material having flexibility even at cryogenic temperatures are provided on both sides of the reinforcing substrate 42 having a network structure, not a flat reinforcing member such as a fabric. By having such a structure, even when the balloon is inflated by injecting an inert gas into the balloon, the inner membrane 41, the reinforcing substrate 42, and the outer membrane 44 extend equally, stress is less likely to concentrate between the inner membrane 41 and the reinforcing substrate 42 and between the outer membrane 44 and the reinforcing substrate 42, and the internal pressure can be higher than that of a conventional balloon. At the same time, breakage is less likely to occur, and durability is high.

The material of the inner membrane 41 and the outer membrane 44 is at least one selected from the group consisting of silicon rubber and fluororubber, but is preferably silicon rubber. The fiber 43 is one or more materials selected from the group consisting of polyethylene, nylon, and aramid, but is preferably ultra-high density polyethylene.

Although general high density polyethylene has a molecular weight of tens of thousands to hundreds of thousands, the "ultra-high molecular weight polyethylene" used herein is a polyethylene having a molecular weight of 5 million to 9 million. Ultra-high molecular weight polyethylene is superior in wear resistance, impact resistance and chemical resistance compared to high density polyethylene. In the present invention, a material such as ultra-high molecular weight polyethylene having such excellent physical properties is not simply used as the material of the reinforcing substrate 42, but the reinforcing substrate 42 has a network structure composed of a fiber bundle, so that in the present invention, it is possible to exhibit performance superior to that of conventional balloons.

The fiber 43 preferably has a diameter of from 440 dtex to 1760 dtex, more preferably from 440 dtex to 1320 dtex. A space (knot) between fibers in the reinforcing substrate 42 is preferably from 0 mm to 5 mm when the balloon is not inflated, more preferably from 0.05 mm to 3 mm.

Ultra-high molecular weight polyethylene fibers are preferably those in which ultra-high molecular weight polyethylene is thinned with a solvent to form a gel-like yarn with little molecular entanglement, the gel-like yarn is pulled by a technique called super-stretching, and the molecular chain is fully extended.

Conventional Insertion Device

FIG. 4 shows a known vent pipe isolation device. A vent pipe isolation device 51 includes a storage pipe 52, an operation pipe 54*a*, a flexible tube 57, an operation pipe 54*b*, a balloon 60, and a balloon attachment portion 59. A specific example of the balloon attachment portion 59 is a Jubilee band. The operation pipe 54*a* has a center holding member 55, and the operation pipe 54*a* is held at the center of the storage pipe 52 by a lip packing 61 and the center holding member 55.

At a right end of the operation pipe 54*a*, a pressure relief valve 62, a gas supply/discharge unit 64, and a pressure gauge 65 in the storage pipe are provided. The pressure gauge 65 in the storage pipe is a pressure gauge for measuring the pressure in the storage pipe. If an inert gas leaks from the balloon 60 during inflation, the value of the pressure gauge increases. The gas supply/discharge unit 64 is connected to an inert gas supply source for supplying an inert gas existing outside and an inert gas discharge means. The inert gas supplied to the operation pipe 54*a* is supplied to the operation pipe 54*b* through the flexible tube 57 and inflates the balloon 60. The balloon 60 has a bag shape and is airtightly attached to the operation pipe 54*b* by the balloon attachment portion 59 such as a jubilee band. The storage pipe 52 is also provided with a gas line 67 for inert gas replacement.

After a closing flange 56 is fixed to a balloon insertion pipe inlet, the operation pipe 54*a* is pushed leftward in FIG. 4 to be inserted into the vent pipe through the balloon insertion pipe. The operation pipe 54*a* and the operation pipe 54*b* are connected by the flexible tube 57. However, when a connection angle between a pipe for the balloon insertion pipe and the vent pipe is close to 90 degrees, it is difficult to insert the balloon 60 into the vent pipe. Ideally, a balloon insertion device 51 has a connection angle between the pipe for the balloon insertion pipe and the vent pipe of 45 degrees or less.

As shown in FIG. 1, the balloon 60 has a substrate formed by sewing a fabric, and a silicon rubber layer is formed on the surface of the substrate. In order to reliably occlude the vent pipe with the balloon 60, it is necessary to inflate the balloon 60 to the maximum when the vent pipe is isolated. However, a peripheral length of the balloon 60 is fixed. Thus, it is necessary to use the balloon 60 whose size is suitable for each inner diameter of the vent pipe to be isolated, and the balloon is not versatile. In order to obtain a diameter adhering force that the balloon 60 does not move with respect to the pressure from the tank side toward the outside from the diameter adhering force obtained by inflating the balloon 60, the diameter adhering force depends on a friction coefficient between the balloon and the vent pipe, and isolation performance is not stable.

FIG. 5 is a procedure for using the balloon insertion device 51 shown in FIG. 4. In FIG. 5, only a main configuration will be described. In FIG. 5, a connection angle θ between a vent pipe 71 and an insertion pipe 72 is 45 degrees or less. Below the vent pipe 71, there is a storage tank for liquefied gas such as liquefied natural gas. A flange 73 of the insertion pipe and the closing flange 56 of the balloon insertion device 51 are fixed (FIG. 5(*a*)). An inert gas is injected from the gas line 67 for inert gas replacement and exhausted from a gas supply/discharge unit 64, whereby the inside of the balloon insertion device 51 is replaced with the inert gas. After the replacement, the gas line 67 for inert gas and valves 68 and 69 of the gas supply/discharge unit 64 are closed.

After a valve (not shown) of the insertion pipe 72 is opened, the operation pipe 54*a* is pushed into the storage pipe 52, and a portion forwardly of the operation pipe 54*b* is inserted into the vent pipe 71 (FIG. 5(*b*)). Although the operation pipe 54*a* and the operation pipe 54*b* are connected by the flexible tube 57, it is difficult to make the operation pipe 54*b* vertical in the vent pipe, and the operation pipe 54*b* is often slightly tilted.

When an inert gas is supplied to the balloon 60 in the state shown in FIG. 5(*b*), the balloon 60 also inflates in a tilted state, and adhesion between the balloon 60 and an inner surface of the vent pipe is low (FIG. 5(*c*)). Since there is no reaction force receiving member that receives pressure (gas pressure) applied from the tank side (the lower side of the vent pipe 71), the balloon 60 tends to be moved upward, and the vent pipe 71 is not sufficiently isolated (FIG. 5(*d*)). In other words, when pressure is applied to the balloon 60 from below, the flexible tube 57 cannot sufficiently receive the pressure and deforms, so that the position of the balloon 60 cannot be maintained. As a result, isolation of the vent pipe by the balloon 60 tends to be incomplete.

Insertion Device 1 of the Present Invention

FIG. 6 is an example of a vent pipe isolation device of the present invention. FIG. 6(*a*) is a side sectional view in a major axis direction, and FIG. 6(*b*) is a horizontal sectional view in the major axis direction. A vent pipe isolation device 1 shown in FIG. 6 includes a storage pipe 2, an intermediate support portion 3, a balloon 4, and a balloon attachment portion 5. The storage pipe 2 has a closing flange 6 at an opening 10. In FIG. 6(*a*), the intermediate support portion 3 is not simply cylindrical, the lower surface is shorter than the upper surface, and the opening 10 is formed obliquely. The storage pipe 2 is cylindrical and can store the intermediate support portion 3 therein.

The intermediate support portion 3 can move in the storage pipe 2 in an axial direction (a direction along the operation pipe 8) by moving the operation pipe 8. The balloon attachment portion 5 is adjacent to the intermediate support portion 3 at a position on the opposite side of the storage pipe 2 (a front end side of the intermediate support portion 3). The storage pipe 2, the intermediate support portion 3, and the balloon attachment portion 5 are sequentially connected by the operation pipe 8 penetrating the inside thereof, and the intermediate support portion 3 and the balloon attachment portion 5 are also moved by moving the operation pipe 8.

FIG. 6 shows a state where the operation pipe 8 is pushed in. By pulling out the operation pipe 8 in the right direction in the drawing, the intermediate support portion 3 and the balloon attachment portion 5 are in a state of being stored in the storage pipe 2.

The intermediate support portion 3 is fixed to the operation pipe 8 by a fixing member 11 and a fixing member 12. The fixing member 12 and the operation pipe 8 are connected by a pin 13, and a portion on the right side of the pin 13 of the operation pipe 8 can be bent downward in FIG. 6(a).

The balloon attachment portion 5 is fixed to the operation pipe 8 at a first end portion 14 and a second end portion 19. A hinge portion 15 that is a connection portion between a metal fitting 16 and the operation pipe 8 has a structure that can be bent.

The balloon 4 is airtightly fixed to the balloon attachment portion 5 so as to surround the operation pipe 8. FIG. 7 is an enlarged view of a portion indicated by a symbol A in FIG. 6(a). As described above, the vent pipe isolation balloon of the present invention has a cylindrical shape or a truncated cone shape, and both ends are open. That is, in FIG. 6, the right end and left end portions of the balloon 4 are openings. In the vent pipe isolation device 1, the balloon 4 has a truncated cone shape. The balloon 4 is attached to a first balloon attachment member 7a and a second balloon attachment member 7b of the balloon attachment portion 5 so that the operation pipe 8 becomes the central axis. In FIG. 7, one opening of the balloon 4 is airtightly fixed between a fixing ring 22 and the first end portion 14 via an o-ring 23.

FIG. 8 is an enlarged view of a portion indicated by a symbol B in FIG. 6(a). A left end of the balloon 4 in FIGS. 6(a) and 6(b) is in contact with the second end portion 19, and the other opening of the balloon 4 and the metal fitting 16 are airtightly fixed by a fixing ring 32 via an o-ring 33. A slide ring 17 exists between the fixing ring 32 and the metal fitting 16. As the balloon 4 inflates, the slide ring 17 can move in the axial direction. A resin cover 20 is attached to the second end portion 19 in order to protect the balloon 4 and the inner surface of the vent pipe.

Here, in the vent pipe isolation device 1, the balloon 4 has a truncated cone shape. In this case, the balloon 4 is attached to the balloon attachment portion 5 so as to be tapered on the distal end side (the left side in FIGS. 6(a) and 6(b)). That is, the diameter of the first balloon attachment member 7a is larger than the diameter of the second balloon attachment member 7b. When the balloon 4 is columnar, the diameter of the first balloon attachment member 7a and the diameter of the second balloon attachment member 7b are the same.

Although the balloon attachment portion 5 with the balloon 4 attached needs to be kept airtight inside, a method of attaching the balloon 4 to the balloon attachment portion 5 is not limited to the methods shown in FIGS. 6 to 8, and other known methods may be used. The structure of the balloon attachment portion 5 may be any structure as long as the balloon attachment portion 5 can be kept airtight inside in the state of being attached with balloon 4, and the balloon attachment portion 5 may have a structure other than the structure shown in FIGS. 6 to 8.

The operation pipe 8 includes a gas pipe for supplying an inert gas to the balloon 4 from the outside. The gas pipe is connected to the balloon attachment portion 5 via a connection portion 24, a flexible pipe 25 and a connection portion 26 and has a function of supplying the inert gas to the balloon 4 to inflate the balloon 4 and discharging the inert gas from the balloon 4 to deflate the balloon 4. A pressure relief valve 28, a gas supply/discharge unit 29, a valve 30 and a pressure gauge 31 in the storage pipe are attached to an outer end of the operation pipe 8 (a right end portion in FIGS. 6(a) and 6(b)). The pressure gauge 31 in the storage pipe has the same functions as the pressure gauge 65 in the storage pipe. The gas supply/discharge unit 29 is connected to an inert gas supply source (specific example: an inert gas cylinder) for supplying an inert gas existing outside and an inert gas discharge means (specific example: an exhaust device). The storage pipe 2 is also provided with a gas line 34 for inert gas replacement.

FIG. 9 shows a procedure for using the vent pipe isolation device 1 shown in FIG. 6. In FIG. 9, the connection angle between the vent pipe 71 and the insertion pipe 72 is 90 degrees. First, the closing flange 6 is fixed to the flange 73 of the insertion pipe 72 in a state where the operation pipe 8 is pulled out to the right in the drawing to the maximum (FIG. 9(a)).

The valve 30 of the gas supply/discharge unit 29 and a valve 35 of the gas line 34 for inert gas replacement are opened. An inert gas such as a nitrogen gas is supplied from the gas line 34 for inert gas replacement and exhausted from the gas supply/discharge unit 29, whereby the inside of the vent pipe isolation device 1 is replaced with the inert gas. After the replacement is completed, the valve 30 and the valve 35 are closed. Thereafter, a valve (not shown) of the insertion pipe 72 is opened.

Next, the operation pipe 8 is pushed to the left in the drawing, and the operation pipe 8 is pushed into the storage pipe 2. While the front half of the balloon attachment portion 5 reaches the inside of the vent pipe 71, a side forwardly of the hinge portion 15 can be bent downward by its own weight (FIG. 9(b)).

Further, the operation pipe 8 is pushed into the storage pipe 2 until the pin 13 reaches the center position of the vent pipe 71. A side forwardly of the pin 13 can be bent 90 degrees downward in the vent pipe 71 (FIG. 9(c)). At this time, the hinge portion 15 returns straight.

An inert gas is supplied from the gas supply/discharge unit 29 to inflate the balloon 4 (FIG. 9(d)). At this time, since the length of the balloon 4 in the vertical direction becomes small, the slide ring 17 slides upward. Since the side forwardly of the pin 13 is located at the center of the vent pipe 71, the balloon 4 can inflate in a stable state and occlude the vent pipe 71.

Here, gas pressure is applied to the inflated balloon 4 from below the vent pipe. However, in the vent pipe isolation device 1, since the fixing member 12 functions as a reaction force receiver, the balloon 4 is less likely to move upward, and adhesion between the balloon 4 and the inner surface of the vent pipe 71 can be maintained.

After the isolation is completed, the inert gas in the balloon 4 is discharged through the gas supply/discharge unit 29 to deflate the balloon 4. Then, an operation reverse to the insertion operation is performed, and the vent pipe isolation device 1 is detached from the insertion pipe 72.

Insertion Device 2 of the Present Invention

FIG. 10 is another example of the vent pipe isolation device of the present invention. FIG. 10(a) is a side sectional view in a major axis direction, and FIG. 10(b) is a top sectional view in the major axis direction. Since the basic structure and function of a vent pipe isolation device 101 shown in FIG. 10 are the same as those of the vent pipe isolation device 1 shown in FIG. 6, only the differences will be described here. FIG. 10 shows a state where the balloon 4 is attached to the vent pipe isolation device 101.

In the vent pipe isolation device 101, a storage pipe 102 and an intermediate support portion 103 are longer than the storage pipe 2 and the intermediate support portion 3 of the vent pipe isolation device 1. When the intermediate support portion 103, the balloon 4, and the balloon attachment portion 5 have the same dimensions, an inner diameter of the storage pipe 102 is larger than that of the storage pipe 2 of the vent pipe isolation device 1. In a state where the operation pipe 8 is pulled out from the storage pipe 102, the balloon 4, the balloon attachment portion 5, and the intermediate support portion 103 are all stored in the storage pipe 102.

The vent pipe isolation device 101 includes an insertion pipe 104 in parallel with the operation pipe 8. A left end of the insertion pipe 104 is connected to the fixing member 11 at a right end of the intermediate support portion 103. Since the vent pipe isolation device 101 has the intermediate support portion 103 longer than the vent pipe isolation device 1, a friction between an inner surface of the storage pipe 102 and an outer surface of the intermediate support portion 103 is large. Thus, the insertion pipe 104 which is a dedicated member having high physical strength is provided in addition to the operation pipe 8, and it is preferable to, for example, indirectly insert the operation pipe 8 into the storage pipe 102 by the insertion pipe 104. However, the insertion pipe 104 has any configuration, and the operation pipe 8 may be directly inserted into the storage pipe 102.

The vent pipe isolation device 101 is excellent in insertability and storability of the balloon 4 because the balloon 4 and an inner surface of the insertion pipe 72 do not come into contact with each other when the balloon 4 is inserted into and removed from the insertion pipe 72.

FIG. 11 shows a procedure for using the vent pipe isolation device 101 shown in FIG. 10. A basic usage procedure is the same as that for the vent pipe isolation device 1.

First, the closing flange 6 is fixed to the flange 73 of the insertion pipe 72 in a state where the operation pipe 8 and the insertion pipe 104 are pulled out to the right in the drawing to the maximum (FIG. 11(a)).

Next, the insertion pipe 104 is pushed to the left in the drawing, and the operation pipe 8 is pushed into the storage pipe 102 until a front end of the storage pipe 102 abuts against the inner surface of the vent pipe 71 (FIG. 11(b)). The balloon attachment portion 5 moves in the storage pipe 102 to the left in the drawing while being stored in the intermediate support portion 103.

Next, a side forwardly of the hinge portion 15 is bent downward by its own weight (FIG. 11(c)).

The insertion pipe 104 is pushed into the storage pipe 102. The side forwardly of the pin 13 is bent downward in the vent pipe 71, and the balloon attachment portion 5 further moves below the vent pipe in a state where the hinge portion 15 is also bent.

Further, when the insertion pipe 104 is pushed into the storage pipe 102, the balloon attachment portion 5 is bent at a right angle at the pin 15, and the hinge portion 13 returns straight (FIG. 11(d)).

An inert gas is supplied from the gas supply/discharge unit 29 to inflate the balloon 4 (FIG. 11(e)). Since the length of the balloon 4 in the vertical direction becomes small, the slide ring 17 slides upward. Since the side forwardly of the pin 13 is located at the center of the vent pipe 71, the balloon 4 can inflate in a stable state and occlude the vent pipe 71.

Gas pressure is applied to the inflated balloon 4 from below the vent pipe. However, like the vent pipe isolation device 1, since the fixing member 12 functions as a reaction force receiver, the balloon 4 is less likely to move upward, and adhesion between the balloon 4 and the inner surface of the vent pipe 71 can be maintained.

After the isolation is completed, the inert gas in the balloon 4 is discharged to deflate the balloon 4. Then, the operation reverse to the insertion operation is performed, and the vent pipe isolation device 101 is detached from the insertion pipe 72.

Example

Izanas (440 dtex) manufactured by Toyobo Co., Ltd. was used as ultra-high molecular weight polyethylene fibers, and a reinforcing substrate was produced by weaving the fibers into a jersey stitch pattern (fiber interval: 3 mm) by machine knitting. This reinforcing substrate has a columnar shape with a length of 81 cm having an upper surface and a lower surface of 12 cm in diameter, and the entire substrate is uniformly woven into a jersey stitch pattern. KE136YU manufactured by Shin-Etsu Chemical Co., Ltd. was used as silicone rubber, and a silicone rubber layer (inner membrane and outer membrane) having a thickness of 2 mm was formed on the inside and outside of the reinforcing substrate, thereby producing a vent pipe isolation balloon of the example. FIG. 12 is an appearance photograph (inflated state) of a vent pipe isolation balloon of Example.

Comparative Example

A high-strength fabric (thickness: 0.45 mm) made of aramid fiber (SCK-45W from ACHILLES CORPORATION) was used, and the fabric was sewn into a balloon shape (diameter of intermediate portion: 32 cm, length in axial direction: 34 cm) as shown in FIG. 1(b). As for the used fabric, the whole inside was a silicon rubberized fabric, and a silicon rubber layer was formed on the outer side. Silicon rubber as the inner and outer membranes has a thickness of 2 mm. This conventional type of balloon was used as a balloon of Comparative Example.

(Performance Test 1)

The balloon of the example or comparative example was stored inside a stainless steel pipe (length: 130 cm) having a pipe diameter of 350 A. In the balloon of the example, rubber was attached to one end, the balloon was airtightly isolated by tightening a band, and a nitrogen gas supply pipe (made of stainless steel, 25 A) was airtightly attached to the other end. In the balloon of the comparative example, the same nitrogen gas pipe was airtightly attached to an opening.

First, at room temperature, a nitrogen gas was supplied so that the internal pressure of the balloon reached 0.01 MPa, and it was confirmed that the balloon inflated smoothly, the balloon was adhered firmly to an inner surface of the stainless steel pipe, wrinkles did not occur, and there was no gas leakage.

(Performance Test 2)

Next, a stainless steel pipe having a pipe diameter of 350 A and storing the balloon of the example or comparative example was stored in a cryogenic-temperature tank. The nitrogen gas supply pipe is connected to a nitrogen gas cylinder outside the cryogenic-temperature tank, and can supply nitrogen gas to the balloon inside the cryogenic-temperature tank. While keeping the inside of the cryogenic-temperature tank at −40° C., a nitrogen gas was supplied so that the internal pressure of the balloon reached 0.01 MPa, and it was confirmed that the balloon inflated smoothly, the balloon was adhered firmly to the inner surface of the stainless steel pipe, wrinkles did not occur, and there was no gas leakage.

(Performance Test 3)

At room temperature, water was supplied into the balloon of the example or comparative example so that the internal pressure of the balloon was 0.6 MPa, and the balloon was inflated. At that time, it was confirmed that both of the two balloons were inflated smoothly, wrinkles did not occur, and there was no water leakage.

(Performance Test 4)

The balloon of the example or comparative example was stored in a stainless steel pipe having a pipe diameter of 250 A, water was supplied into the balloon of the example or comparative example so that the internal pressure of the balloon was 0.6 MPa, and the balloon was inflated. At that time, it was confirmed that both of the two balloons were inflated smoothly, the balloon was adhered firmly to the inner surface of the stainless steel pipe, wrinkles did not occur, and there was no water leakage.

INDUSTRIAL APPLICABILITY

The vent pipe isolation balloon and the vent pipe isolation device of the present invention as isolation devices for a liquefied gas storage tank are useful in the technical field of ships and high-pressure gas.

REFERENCE SIGNS LIST 1, 101 vent pipe isolation device of the present invention
2, 102 storage pipe
3, 103 intermediate support portion
4 balloon (vent pipe isolation balloon)
5 balloon attachment portion
6 closing flange
7a first balloon attachment member
7b second balloon attachment member
8 operation pipe
9 earth
10 opening of intermediate support portion
11 fixing member
12 fixing member
13 pin
14 first end (near-side end of balloon attachment portion)
15 hinge portion
16 metal fitting
17 slide ring
18 o-ring
19 second end (tip end-side end of balloon attachment portion)
20 resin cover
21 protective sheet
22 fixing ring
23 o-ring
24 connection portion
25 flexible hose
26 connection portion
27 screw
28 pressure relief valve
29 gas supply/discharge unit
30 valve
31 pressure gauge in storage pipe
32 fixing ring
33 o-ring
34 gas line for inert gas replacement
35 valve
41 inner membrane
42 reinforcing substrate
43 fiber
44 outer membrane
51 known vent pipe isolation device
52 storage pipe
53 closed portion of storage pipe
54a operation pipe (near side)
54b operation pipe (tip end side)
55 center holding member
56 closing flange
57 flexible tube
58 end rubber
59 balloon attachment portion
60 balloon
61 lip packing
62 pressure relief valve
63 earth
64 gas supply/discharge unit
65 pressure gauge in storage pipe
67 gas line for inert gas replacement
68 valve
69 valve
71 vent pipe
72 insertion pipe
73 flange
104 operation pipe
201 conventional isolation balloon
202 upper portion
203 intermediate portion
204 lower portion
205a, 205b stitching portion
206 opening
207 silicon rubber layer
208 convex portion

The invention claimed is:

1. A balloon for temporarily isolating a vent pipe of a liquefied gas storage tank, the balloon comprising:
an inner membrane;
a reinforcing substrate; and
an outer membrane,
the balloon having a cylindrical shape or a truncated cone shape having openings at both ends, and being inflated when an inert gas is injected into the balloon with the openings sealed, wherein
a material of the inner membrane and the outer membrane is silicon rubber,
the reinforcing substrate is formed of a bundle of ultra-high molecular weight polyethylene fibers and has a network structure,
the reinforcing substrate is sandwiched between the inner membrane and the outer membrane,
the fiber bundle has a diameter of from 440 dtex to 1760 dtex,
the number of filaments constituting the fiber bundle is from 390 to 1560,
in the network structure, a knot between fibers is from 0 mm to 5 mm when the balloon is not inflated, and
the inner membrane and the outer membrane each have a thickness of from 2 mm to 6 mm.

2. The balloon according to claim 1, wherein the network structure is a network structure in which the bundle of ultra-high molecular weight polyethylene fibers is woven by jersey stitch.

3. A vent pipe isolation device for temporarily isolating a vent pipe of a liquefied gas storage tank, the vent pipe isolation device comprising:
   a storage pipe;
   an operation pipe;
   an intermediate support portion;
   a balloon attachment portion; and
   a balloon, wherein
   the storage pipe has a closing flange on an opening side thereof, and stores the intermediate support portion,
   the intermediate support portion is movable in the storage pipe in an axial direction, and has a front end side opening downward,
   the storage pipe, the intermediate support portion, and the balloon attachment portion are arranged along an identical central axis,
   the balloon attachment portion is adjacent to the front end side of the intermediate support portion,
   the intermediate support portion is fixed to the operation pipe at both ends thereof,
   the balloon attachment portion has a first balloon attachment member and a second balloon attachment member at both ends thereof and a hinge portion at an intermediate position, a side forwardly of the hinge portion being bendable,
   the operation pipe is bendable at a fixing portion on a side of the intermediate support portion that is adjacent to the balloon attachment portion,
   the first balloon attachment member and the second balloon attachment member are fixing members for airtightly fixing the balloon, at least one of the first balloon attachment member and the second balloon attachment member being movable in the axial direction,
   the operation pipe includes therein a gas pipe for supplying an inert gas to the balloon from an outside and discharging the inert gas from the balloon to the outside,
   the balloon includes an inner membrane, a reinforcing substrate, and an outer membrane, the balloon having a cylindrical shape or a truncated cone shape having openings at both ends thereof, and being inflated when an inert gas is injected into the balloon with the openings sealed,
   a material of the inner membrane and the outer membrane is cold resistant rubber,
   the reinforcing substrate is formed of a fiber bundle and has a network structure, and
   the reinforcing substrate is sandwiched between the inner membrane and the outer membrane.

4. The vent pipe isolation device according to claim 3, wherein
   the material of the inner membrane and the outer membrane is silicon rubber, and
   the reinforcing substrate is a bundle of ultra-high molecular weight polyethylene fibers.

5. The vent pipe isolation device according to claim 4, wherein the network structure is a network structure in which the bundle of ultra-high molecular weight polyethylene fibers is woven by jersey stitch.

6. The vent pipe isolation device according to claim 3, wherein the network structure is a network structure in which the bundle of ultra-high molecular weight polyethylene fibers is woven by jersey stitch.

7. A vent pipe isolation device for temporarily isolating a vent pipe of a liquefied gas storage tank, the vent pipe isolation device comprising:
   a storage pipe;
   an operation pipe;
   an intermediate support portion;
   a balloon attachment portion; and
   a balloon, wherein
   the storage pipe has a closing flange on an opening side thereof, and stores the intermediate support portion and the balloon attachment portion,
   the intermediate support portion and the balloon attachment portion are arranged in the storage pipe along an identical central axis,
   the intermediate support portion and the balloon attachment portion are movable in the storage pipe in an axial direction, and has a front end side opening downward,
   the intermediate support portion is fixed to the operation pipe at an intermediate position thereof and on a closed portion side,
   the balloon attachment portion has a first balloon attachment member and a second balloon attachment member at both ends thereof and a hinge portion at an intermediate position, a side forwardly of the hinge portion being bendable,
   the operation pipe is bendable at a fixing portion on a side of the intermediate support portion that is adjacent to the balloon attachment portion,
   the first balloon attachment member and the second balloon attachment member are fixing members for airtightly fixing the balloon, at least one of the first balloon attachment member and the second balloon attachment member being movable in the axial direction,
   the operation pipe includes therein a gas pipe for supplying an inert gas to the balloon from an outside and discharging the inert gas from the balloon to the outside,
   the balloon includes an inner membrane, a reinforcing substrate, and an outer membrane, the balloon having a cylindrical shape or a truncated cone shape having openings at both ends thereof, and being inflated when an inert gas is injected into the balloon with the openings sealed,
   a material of the inner membrane and the outer membrane is cold resistant rubber,
   the reinforcing substrate is formed of a fiber bundle and has a network structure, and
   the reinforcing substrate is sandwiched between the inner membrane and the outer membrane.

8. The vent pipe isolation device according to claim 7, wherein
   the material of the inner membrane and the outer membrane is silicon rubber, and
   the reinforcing substrate is a bundle of ultra-high molecular weight polyethylene fibers.

9. The vent pipe isolation device according to claim 8, wherein the network structure is a network structure in which the bundle of ultra-high molecular weight polyethylene fibers is woven by jersey stitch.

10. The vent pipe isolation device according to claim 7, wherein the network structure is a network structure in which the bundle of ultra-high molecular weight polyethylene fibers is woven by jersey stitch.

* * * * *